United States Patent [19]
Regnier

[11] 4,307,324
[45] Dec. 22, 1981

[54] PHASE LOCKED LOOP MOTOR SPEED CONTROL

[75] Inventor: Gerard S. Regnier, Fremont, Calif.
[73] Assignee: Fairchild Camera and Instrument Corp., Mountain View, Calif.
[21] Appl. No.: 133,692
[22] Filed: Mar. 25, 1980
[51] Int. Cl.³ .............................................. H02P 5/16
[52] U.S. Cl. ................................... 318/314; 318/318; 318/341
[58] Field of Search ..................... 318/314, 318, 341

[56] References Cited

U.S. PATENT DOCUMENTS

| | | | |
|---|---|---|---|
| 3,176,208 | 3/1965 | Gifft | 318/314 |
| 3,487,367 | 12/1969 | Sklaroff | 318/318 |
| 3,493,834 | 2/1970 | Worrall | 318/314 |
| 3,628,114 | 12/1971 | Pattantyus | 318/314 |
| 4,155,033 | 5/1979 | DeBell et al. | 318/341 |

OTHER PUBLICATIONS

Smithgall, D. H., "A Phase-Locked Loop Motor Control System", IEEE Transactions on Industrial & Control Instrumentation, vol. IEC122, No. 4, 11-75.

*Primary Examiner*—David Smith, Jr.
*Attorney, Agent, or Firm*—Paul J. Winters; Theodore S. Park; Thomas Langer

[57] ABSTRACT

A precision motor speed control system employing a phase locked loop in which the inertial mass of the motor, its tachometer and motor driven devices, such as fly wheels, tape transports, etc., perform the functions of the usual low pass filter and voltage control oscillator.

3 Claims, 3 Drawing Figures

PHASE LOCKED LOOP MOTOR SPEED CONTROL

BRIEF SUMMARY OF THE INVENTION

This invention relates generally to motor speed control circuits and particularly to a novel phase locked loop speed control circuit in which the inertial mass of the motor, its tachometer, and other associated driven components perform the functions of the loop filter and output control VCO.

By thus including the motor circuit as a component part of a phase locked loop, the speed control accuracy becomes absolute. The motor locks in to a precise speed that is continuously monitored and corrected by the detected variations in phase difference between the A.C. output of the motor driven tachometer and an output reference signal, the frequency of which is selected by an external speed or rate control device.

The phase detector monitoring and comparing these two frequencies is a commercially available circuit (e.g., Modified Motorola type MC4344) that is provided with dual output terminals. If the phase of the reference input signal leads the loop generated signal, a pulsed signal appears on the first output terminal of the comparator and if the phase of the reference signal lags the tachometer generated signal, the pulsed signal appears on the second output terminal.

The phase detector output is applied to a motor drive circuit that generates from the two input signals a three-level, pulse-width-modulated output signal in which the high level pulsed output drives the external motor to a higher speed; the low level pulsed signal causes the braking of the motor, and the mid-level signal is a neutral drive signal to the motor and occurs when the system is properly phase locked and tracking.

The motor, which is external to the circuitry, is connected to a tachometer that generates an A.C. signal at a frequency determined by the rotational speed of the motor and hence the tachometer. This tachometer generated signal represents the usual VCO in conventional PLL loop systems and is applied to a tachometer input comparator that compares the tachometer signal with a D.C. level and produces output signals of corresponding frequency and at a suitable level and waveshape for acceptance by the frequency phase detector circuit.

DESCRIPTION OF THE DRAWINGS

In the drawings which illustrate a preferred embodiment of the invention.

DETAILED DESCRIPTION

Figure 1:
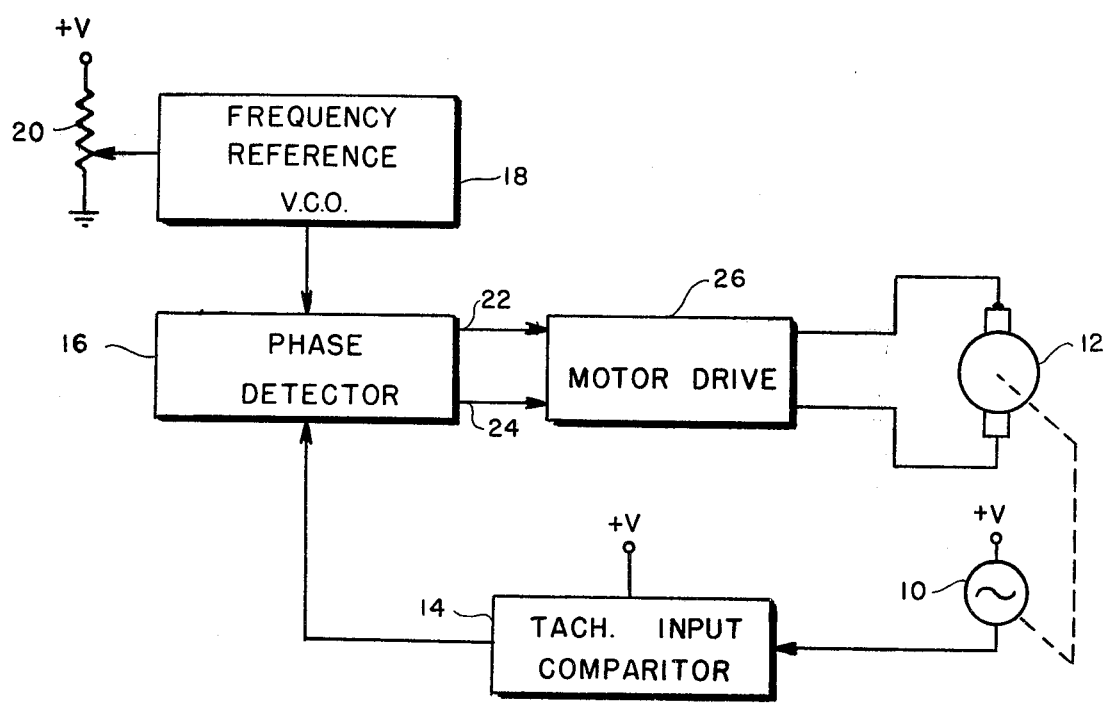
FIG. 1 is a block diagram of the PLL motor speed control circuitry.

It is well-known that in any phase locked loop (PLL) system, the object is to force an oscillator signal that varies directly in frequency with the loop output to precisely conform in phase with an externally applied control signal. In the embodiment illustrated in the block diagram of FIG. 1, the oscillator signal is generated by a tachometer 10 that is directly linked to a variable speed motor 12 which may be used, for example, for driving tape transports, capstans, or other devices requiring an accurate but variable speed drive system.

Tachometer 10 generates an A.C. sine wave, the frequency of which varies with the rotational speed of the motor 12. The tachometer output signal is applied to a tachometer input comparator circuit 14 which shapes the A.C. sine wave signal into square wave signals of corresponding frequency and with amplitudes that are suitable for the subsequent processing by the various gating circuits in the loop phase detector 16.

Phase detector 16 compares the square wave signals generated by the tachometer input comparator 14 with square wave signals produced by a variable speed control, which, in the preferred embodiment, is the frequency reference VCO 18. This voltage control oscillator 18 generates a square wave output signal that may be varied in frequency by adjustment of the rate control potentiometer 20. The phase detector 16 compares the phases of its two input signals and produces output signals at two output terminals. As previously noted, the phase detector 16 can be commercially available type which generates a constant high level signal at the output 22 and a low level signal at the output 24 when there is no phase difference between the two input signals and the system is properly locked and tracking.

If the control signal from VCO 18 leads the tachometer signal in phase, thus indicating that the motor is slipping behind its intended speed, the signal at output 22 remains at its high level, but the signal at terminal 24 is pulsed between its low and high levels and at a pulse width, or frequency, that is dependent upon the magnitude of the phase difference between the tachometer and VCO signals.

If the rate control 20 is readjusted for a slower motor speed, the VCO 18 output signal is lowered in frequency and its phase will lag behind that of the tachometer input comparator 14. When this reference signal lags, the signal at the output 24 is at a continuous low level state while that at the output 22 is pulsed between high and low level states.

Figure 3:
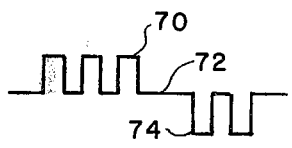
FIG. 3 is a waveform diagram illustrating the three-level pulse-width-modulated output signal of the motor drive circuit of FIG. 2.

The two outputs 22 and 24 of the phase detector 16 are applied to a motor drive which, as will be subsequently explained in greater detail, converts the two signals into a single three-level pulse width modulated motor control signal as illustrated in FIG. 3. This three-level signal is applied to control circuitry associated with the motor for increasing, sustaining, or braking the speed of the motor. When the three-level control signal is at its mid-level, a speed sustaining voltage level of approximately $1.75V_{be}$ is applied to transistor gates in the motor control circuitry to apply a speed sustaining voltage to the motor. When the three-level control signal is pulsed to its high level, control signals of approximately $3V_{be}$ operate to open transistor gates and the motor control circuit that will apply the full supply voltage to the motor to thereby increase its speed. When the three-level signal is at its low pulsed level, a motor control gating transistor effectively short-circuits the motor armature terminals to provide back e.m.f. braking.

Figure 2:
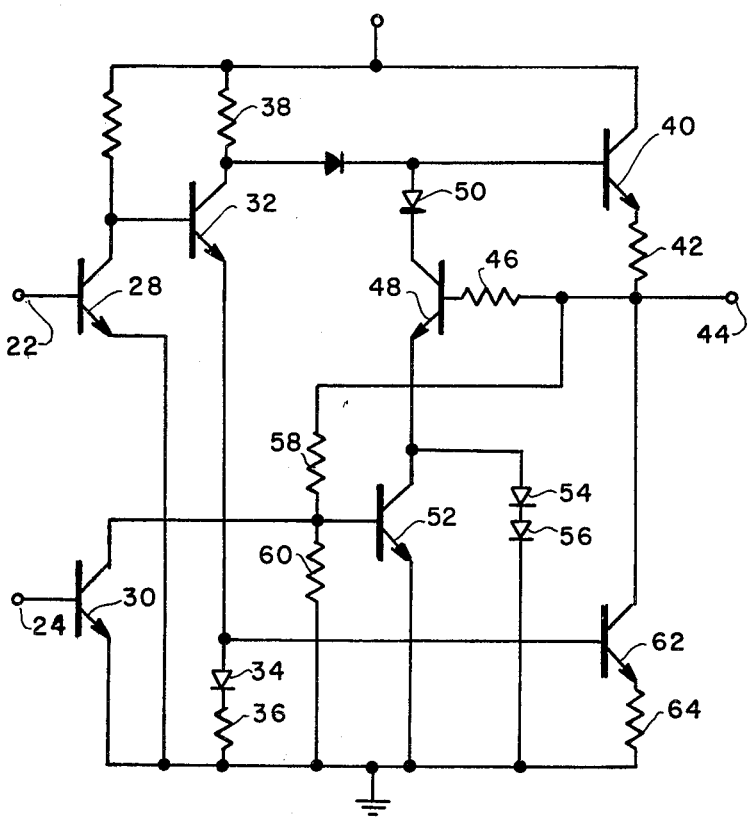
FIG. 2 is a simplified schematic diagram of the motor drive circuitry of FIG. 1.

The motor drive circuit 26 of FIG. 1 is illustrated in greater detail in the schematic diagram of FIG. 2 wherein the phase detector outputs 22 and 24 are shown connected to the bases of NPN transistors 28 and 30, respectively, the emitters of each being coupled to ground reference. The collector of transistor 28 is coupled through a suitable resistance to the positive voltage source and also to the base of NPN transistor 32, the emitter of which is coupled through a diode 34 and series resistance 36 to ground reference. The collector of transistor 32 is coupled through a resistance 38 to the positive voltage source and also to the base of NPN transistor 40, the collector of which is coupled directly to the positive voltage source and the emitter of which is coupled through a relatively low value resistance 42 to the output terminal 44. Output terminal 44 is connected through a resistance 46 which may have a value of approximately 15K to the base of NPN transistor 48, the collector of which is connected to the cathode of diode 50, the anode of which is coupled to the interconnection of the collector of transistor 32 and the base of transistor 40.

The collector of the input transistor 30 is coupled to the base of NPN transistor 52, the emitter of which is grounded and the collector of which is coupled to the emitter of transistor 48. The collector of transistor 52 is also coupled through a pair of series connected diodes 54 and 56 to ground reference so that the collector of transistor 52 is clamped at a level of either $3/4 V_{be}$ or $2V_{be}$. The base of transistor 52 is coupled to the output terminal 44 through a resistance 58 having a value of approximately 10K and is also coupled to ground reference through a resistance 60 having a value of approximately 14K. Output terminal 44 is also coupled to the collector of an NPN transistor 62, the emitter of which is coupled through a 25 ohm resistance 64 to ground reference. The base of transistor 62 is coupled to the emitter of the transistor 32.

OPERATION OF THE MOTOR DRIVE CIRCUIT

At the outset it may be advantageous to very briefly review the function of the phase detector 16 as follows:

For increased motor speed, output 22 is at a high level and output 24 is pulsed.

For sustaining speed, the output 22 is at high level and the output 24 is at a low level.

For braking, output 22 is pulsed and the output 24 is at a low level.

The high level output 22 is applied to the base of transistor 28 to render it conductive and to thereby effectively ground the base of transistor 32 to render it non-conductive. This places a high level on the base of transistor 40 to render it conductive and to provide a current path between the voltage source and the output terminal 44. Thus, a high input to the base of transistor 28 will admit current to the output terminal 44 which is either at a high level or neutral depending upon the signal applied to transistor 30.

A low level output 24 applied to the base of transistor 30 will turn transistor 30 off so that the base of transistor 52 will go to a $V_{be}$ level to render it conductive. The resistance ratio of the resistors 58 and 60 then provides the neutral or mid-level of $1.75V_{be}$ at the output terminal 44.

When a pulsed input is applied to the base of transistor 30 the high level pulses render transistor 30 conductive to shut off transistor 52. Transistor 52 which effectively short-circuits the two diodes 54 and 56 then drops out of the circuit. The base to emitter drop across diodes 54, 56 and the transistor 48 provide the three $V_{be}$ driving level at the output terminal 44.

During braking the input to transistor 28 is pulsed between $V_{be}$ and saturation. At a low input level, transistor 28 is off thereby raising the base voltage on transistor 32 to render it conductive and removing base current from 40. This activates the current mirror of components 34, 36, 62 and 64. Thereby providing a current sync at terminal 44 to ground. Thus, to provide output drive pulses such as the pulses 70 of FIG. 3, transistor 40 must be on, transistors 32 and 52 must be off, and there must be no current through transistor 62.

To provide a neutral sustaining output such as the level 72 of FIG. 3, transistor 40 must be conductive, transistor 52 must also be conductive to short out the diodes 54 and 56, and transistor 62 must be off. To provide the low level braking signal 74 of FIG. 3, transistors 28 and 32 must be pulsed to provide pulse conduction through transistor 62.

Having thus described the invention, what is claimed is:

1. A phase locked loop speed control system comprising:
    a variable speed motor;
    a tachometer coupled to said motor and generating an alternating output signal having a frequency that is proportional to the rotational speed of said motor;
    a speed control signal source for generating alternating output signals having frequencies proportional to the desired speed of said motor;
    a phase detector coupled to said tachometer and to said speed control signal source, said phase detector comparing the phase differences between said tachometer output signals and said speed control source output signals, said phase detector generating first and second output signals indicative of a leading and lagging of said speed control signals from said tachometer output signals; and
    motor drive circuitry responsive to said first and second phase detector output signals, said motor drive circuitry being coupled to said variable speed motor for generating positive going pulses for increasing the speed of said motor, a neutral level for sustaining said motor speed, and negative going pulses for braking the speed of said motor.

2. The phase locked loop motor speed control system claimed in claim 1 further including tachometer input comparator circuitry coupled to said tachometer and responsive to the alternating output signals therefrom for converting said alternating output signals into square wave signals having frequencies corresponding to said alternating tachometer signals.

3. The phase locked loop motor speed control system claimed in claim 2 wherein said speed control signal source is a voltage controlled oscillator responsive to an externally applied voltage level, and wherein its generated alternating output signals are square waves.

* * * * *